US012592595B2

(12) United States Patent　　　　(10) Patent No.:　US 12,592,595 B2
Liu et al.　　　　　　　　　　　　(45) Date of Patent:　　Mar. 31, 2026

(54) ELECTRIC MOTOR WITH AXIAL AND RADIAL PERMANENT MAGNETS

(71) Applicant: CITY UNIVERSITY OF HONG KONG, Kowloon (HK)

(72) Inventors: Chunhua Liu, Kowloon (HK); Rundong Huang, Kowloon (HK); Zaixin Song, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 391 days.

(21) Appl. No.: 17/355,167

(22) Filed: Jun. 22, 2021

(65) Prior Publication Data

US 2022/0407375 A1　　Dec. 22, 2022

(51) Int. Cl.
*H02K 1/2793*　　　(2022.01)
*B25J 18/00*　　　　(2006.01)
*H02K 1/278*　　　　(2022.01)
*H02K 1/2786*　　　(2022.01)
*H02K 1/30*　　　　(2006.01)

(52) U.S. Cl.
CPC ............ *H02K 1/2793* (2013.01); *B25J 18/00* (2013.01); *H02K 1/278* (2013.01); *H02K 1/2786* (2013.01); *H02K 1/30* (2013.01); *H02K 2213/03* (2013.01)

(58) Field of Classification Search
CPC .. H02K 1/2795; H02K 1/2796; H02K 1/2798; H02K 1/28; H02K 15/02; H02K 16/02; H02K 2213/03
USPC ... 310/49.32, 49.42, 156.36, 156.37, 156.08, 310/90.5, 266–268
See application file for complete search history.

(56) References Cited

U.S. PATENT DOCUMENTS

| | | | | |
|---|---|---|---|---|
| 9,419,483 B2 * | 8/2016 | Hunstable | ............ | H02K 1/2766 |
| 2005/0236918 A1 * | 10/2005 | van den Bergh | ...... | H02K 39/00 |
| | | | | 310/156.43 |
| 2016/0126794 A1 * | 5/2016 | Gery | ...................... | H02K 1/278 |
| | | | | 310/156.01 |
| 2022/0094220 A1 * | 3/2022 | Islam | ...................... | H02K 1/325 |
| 2022/0131452 A1 * | 4/2022 | Kojima | .................... | B25J 9/126 |

FOREIGN PATENT DOCUMENTS

| | | | | | |
|---|---|---|---|---|---|
| CN | 104393726 A | * | 3/2015 | ............. | H02K 51/00 |
| CN | 109586534 A | * | 4/2019 | ............... | H02K 7/08 |

OTHER PUBLICATIONS

Machine Translation of CN 109586534 A (Year: 2019).*

* cited by examiner

*Primary Examiner* — Jose A Gonzalez Quinones
(74) *Attorney, Agent, or Firm* — Conley Rose, P.C; Michael W. Piper; Gayatry Nair

(57) ABSTRACT

There is disclosed a motor (100) comprising: a stator (120), comprising a core (122) and a plurality of windings (124); and a rotor (140), comprising a plurality of permanent magnets (150, 152, 154), wherein a first portion of the magnets (150, 152) is disposed on two axial rotor portions (142, 144) in close proximity to two respective axial sides of the windings (124), and a second portion of the magnets (154) is disposed on a radial rotor portion (146) in close proximity to a radial side of the windings (124), and wherein energising the windings (124) causes a torque to be applied to the rotor (140) via said two axial rotor portions (144, 144) and said radial rotor portion (146).

10 Claims, 9 Drawing Sheets

CROSS SECTION Y-Y

CROSS SECTION X-X

CROSS SECTION Y-Y, ROTOR ONLY

CROSS SECTION X-X, ROTOR ONLY

120

CROSS SECTION Y-Y, STATOR ONLY 120
124
122
104

126
128

CROSS SECTION X-X, STATOR ONLY

SIDE VIEW (CROSS SECTION)

600

SIDE VIEW (CUT OUT)

ISOMETRIC VIEW (EXPLODED)

Magnetic Flux Density
Contour Plot : T

Maximum: 2.76
Minimum: 0.00

1010

1014

1002
1012
1004

1006

1008

ELECTRIC MOTOR WITH AXIAL AND RADIAL PERMANENT MAGNETS

FIELD OF THE INVENTION

The present invention relates to a motor, and in particular a high torque, direct drive motor suitable for use in robotics and other fields.

BACKGROUND OF THE INVENTION

Electric motors have been in existence for a relatively long time, and a number of different approaches have evolved, including DC and AC motors, brushed motors, synchronous motors, induction motors, and so on. Generally motors all operate on the basic principle of a stator, that is fixed, and a rotor, that moves relative to the stator and provides the motive power of the motor in rotational form.

Robotics is an area of technology that has quite demanding needs in terms of motors, due to the power, speed and accuracy required in movements of robotic arms and the like, and compactness and low weight is also required in order to mount motors directly on the robots. In order to satisfy these requirements, attention has focused on very specific types of motors that are deemed appropriate. Some of these motors operate on a radial principle, and others operate on an axial principle. There are many pros and cons to consider with both approaches.

Typically robot arms have gearing systems (such as planetary gears) to facilitate on-board motors in carrying out the necessary movements. Within the technical field of robotics, it is not expected that robot motors will provide enough torque (given the constraints on size of the motor) to carry out movements unassisted (that is, using direct drive). Attention has therefore focused on how to improve the integration of motors into robotic systems using better gearing, and so on. Gearing systems add unwanted and potentially unnecessary weight, complexity and maintenance requirements, however, so it would be useful to be able to reduce or eliminate them from robotics applications.

The present invention aims to address problems such as this in the prior art.

SUMMARY OF THE INVENTION

According to a first aspect of the present invention, there is provided a motor comprising: a stator, comprising a core and a plurality of windings around the core; and a rotor comprising a plurality of permanent magnets, wherein a first portion of the magnets is disposed on at least one axial rotor portion in close proximity to at least one respective axial side of the windings, and a second portion of the magnets is disposed on at least one radial rotor portion in close proximity to at least one respective radial side of the windings, and wherein energising the windings causes a torque to be applied to the rotor via both said at least one axial rotor portion and said at least one radial rotor portion. Preferably the permanent magnets on the, or each, axial outer rotor are magnetized axially, and the permanent magnets on the, or each, radial inner rotor are magnetized radially. In use, the rotor rotates on an axis, and references to axial and radial directions should be interpreted accordingly with reference to this axis.

By providing magnets on both an axial rotor portion and a radial rotor portion, the torque density of the motor can be increased for a given motor size. The present invention overcomes a tremendous technical prejudice in the (very long established) art towards providing motors that operate either in accordance with an axial principle or a radial principle, but not both.

Accordingly, a direct-drive motor with high torque density can be provided, suitable for robotic arms in industrial manufacture, for example. In other cases, these features can reduce or eliminate gearboxes needed by traditional motors, reducing production and maintenance costs.

Preferably at least one of the first and second portions of magnets (and more preferably both) are arranged to form at least one Halbach array. This can help to concentrate the magnetic flux in the vicinity of the windings, so as to increase the torque further. It can also assist in directing the magnetic flux appropriately from several sides of the stator windings at once.

Preferably each consecutive magnet in the Halbach array (s) is rotated by 45 degrees relative to the preceding magnet. This provides 8 magnets per pole, with several 90 degree rotations, which are particularly convenient for typically cuboid or cubic magnets (which are easy to rotate by right angles at a time). 8 magnets per pole was also found to be a convenient and effective number.

In one particular embodiment, the rotor comprises two axial rotor portions and one radial rotor portion. This provides good encirclement of the stator windings while maximising stability. Preferably the arrangement of magnets on each axial rotor portion is a mirror copy of the arrangement of magnets on the other. This helps to cancel out imbalanced forces on the rotors which would otherwise cause the rotor to tilt, as each of the rotor portions applies a substantially equal and opposite force on the rotor overall, and these forces essentially cancel out.

This feature of the invention may be provided in independent form. Accordingly, in a related aspect of the invention, there is provided a motor comprising: a stator, comprising a core and a plurality of windings; and a rotor, comprising a plurality of permanent magnets, wherein a first portion of the magnets is disposed on two axial rotor portions in close proximity to two respective axial sides of the windings, and a second portion of the magnets is disposed on a radial rotor portion in close proximity to a radial side of the windings, and wherein energising the windings causes a torque to be applied to the rotor via said two axial rotor portions and said radial rotor portion.

Preferably the, or each, axial rotor portion has the same number of magnetic poles as the, or each, radial rotor portion.

Preferably more than 50, 60, 65, 70 or more preferably 75% of the outer perimeter of the windings maintains effective magnetic contact with a permanent magnet disposed on the rotor. The greater the encirclement of the windings by the permanent magnets on the rotor, the more torque should be generated by the motor.

Put another way: preferably the geometric centre of the windings is encircled by permanent magnets disposed on the rotor and within close magnetic proximity of the windings, the magnets subtending an angle of more than 180, 200, 220, 245, 255, 265, or more preferably 270 degrees of circumference of the windings. This is preferably true with respect to a typical or average section of the windings, making all relevant assumptions.

Put yet another way: preferably the windings have four sides and permanent magnets on the rotor are magnetically proximate to at least three of the sides of the windings. Preferably three sets of magnets maintain a respective parallel, spaced-apart relationship with the three sides.

The motor may comprise a reinforcement structure urging (or fixing) said at least one axial rotor portion towards said at least one radial rotor portion. The reinforcement structure preferably comprises at least one bolt passing through an axial hole in the radial rotor portion and secured on said at least one axial rotor portion. Preferably a plurality of holes and bolts are arranged circumferentially and pass through a back iron portion of the radial rotor portion, but may alternatively pass through another part of the radial rotor portion (for example a reinforced section adjacent to the back iron and/or permanent magnets).

On which note, preferably each said axial rotor portion and each said radial rotor portion includes a respective back iron portion disposed on the distal side of the permanent magnets relative to the windings. Preferably the thickness of the back iron portion is equal to, or within 1, 2, 5, 10, 15, 20, 25, 30, 40, 50, 75 or 100%, of the thickness of adjacent permanent magnets. Preferably all of the permanent magnets are of substantially equal thickness, or within, say, 1, 2, 5, 10, 15, 20 or 25% of each other Preferably the axial length of the permanent magnets on said at least one radial rotor portion is equal to or greater than the axial length of the windings on the stator. This helps improve magnetic contact and/or encirclement of the windings.

In another aspect of the invention, there is provided a robotics system, including a robotic arm including a motor as aforesaid, and a control system for controlling the motor so as to cause the robotic arm to move.

There is also provided an axial-radial in-wheel motor, limited as necessary or appropriate with any of the above-mentioned features.

Although various aspects and embodiments of the present invention have been described separately above, any of the aspects and features of the present invention can be used in conjunction with any other aspect, embodiment or feature where appropriate. For example apparatus features may where appropriate be interchanged with method features. References to single entities should, where appropriate, be considered generally applicable to multiple entities and vice versa. Unless otherwise stated herein, no feature described herein should be considered to be incompatible with any other, unless such a combination is clearly and inherently incompatible. Accordingly, it should generally be envisaged that each and every separate feature disclosed in the intro-duction, description and drawings is combinable in any appropriate way with any other unless (as noted above) explicitly or clearly incompatible.

BRIEF DESCRIPTION OF THE DRAWINGS

The invention will now be described further, by way of example, with reference to the accompanying drawings, in which.

DETAILED DESCRIPTION OF THE PREFERRED EMBODIMENT(S)

Figures 1A, 1B:
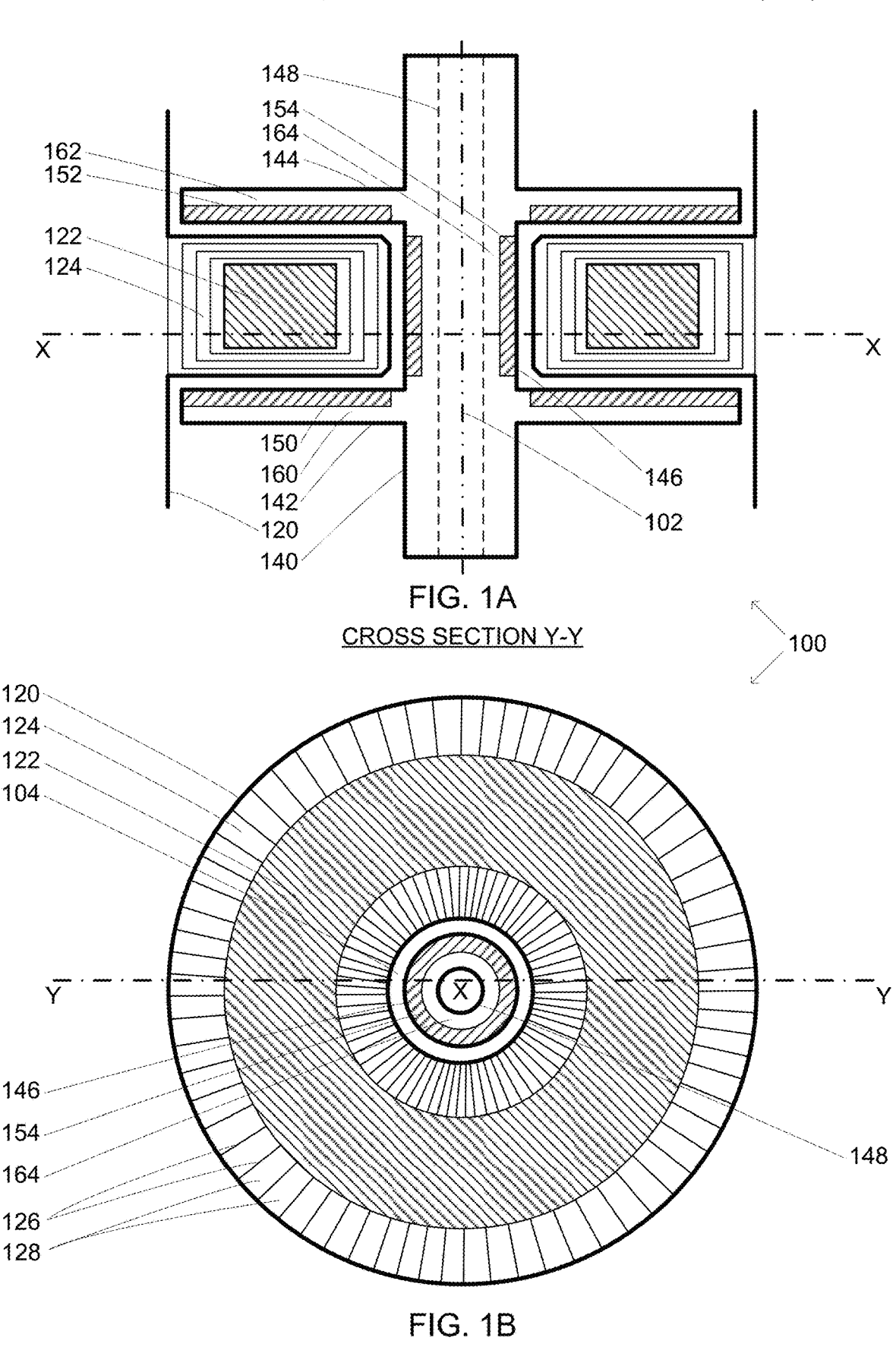
FIGS. 1A to 1F are various views of a first exemplary embodiment of a motor including a rotor and a stator.
Figures 1C, 1D:
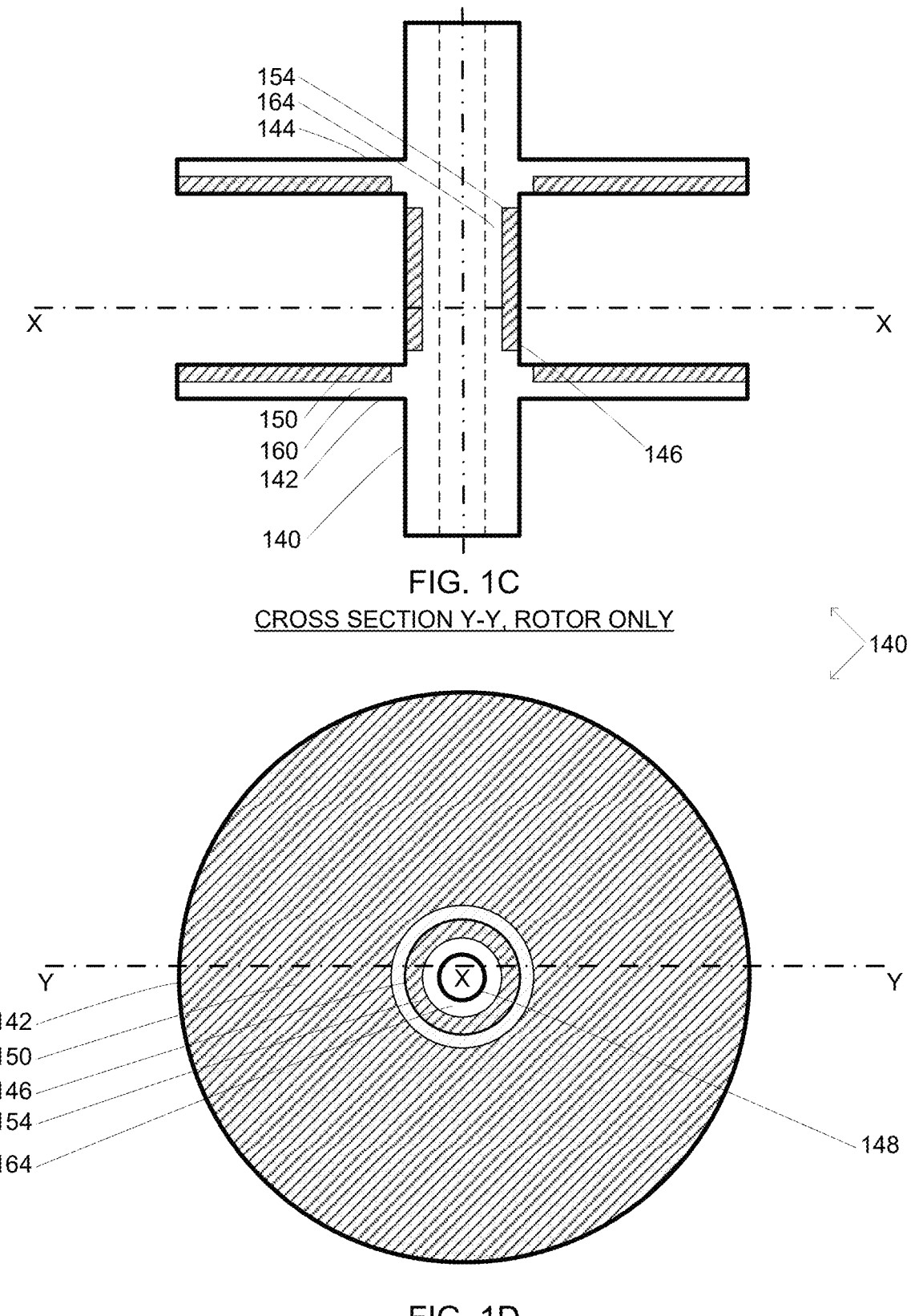
Figure 1E:
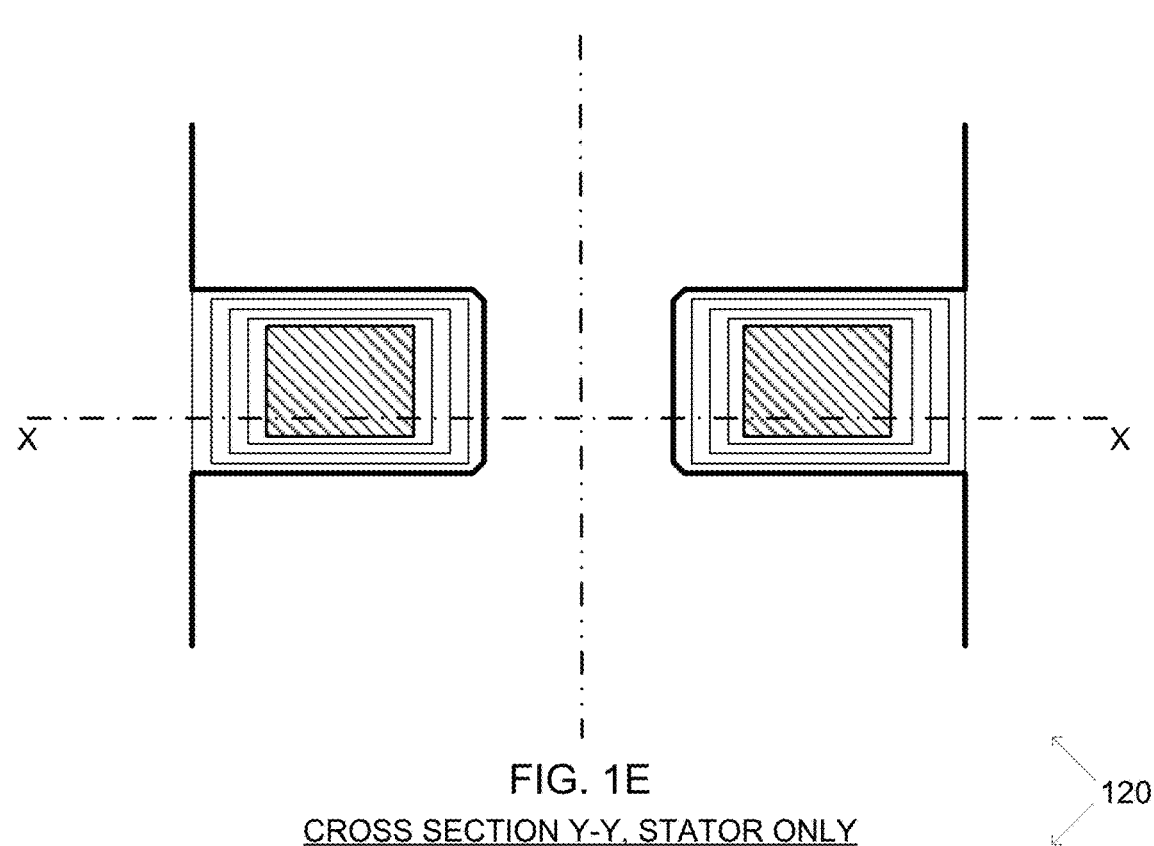
Figure 1F:
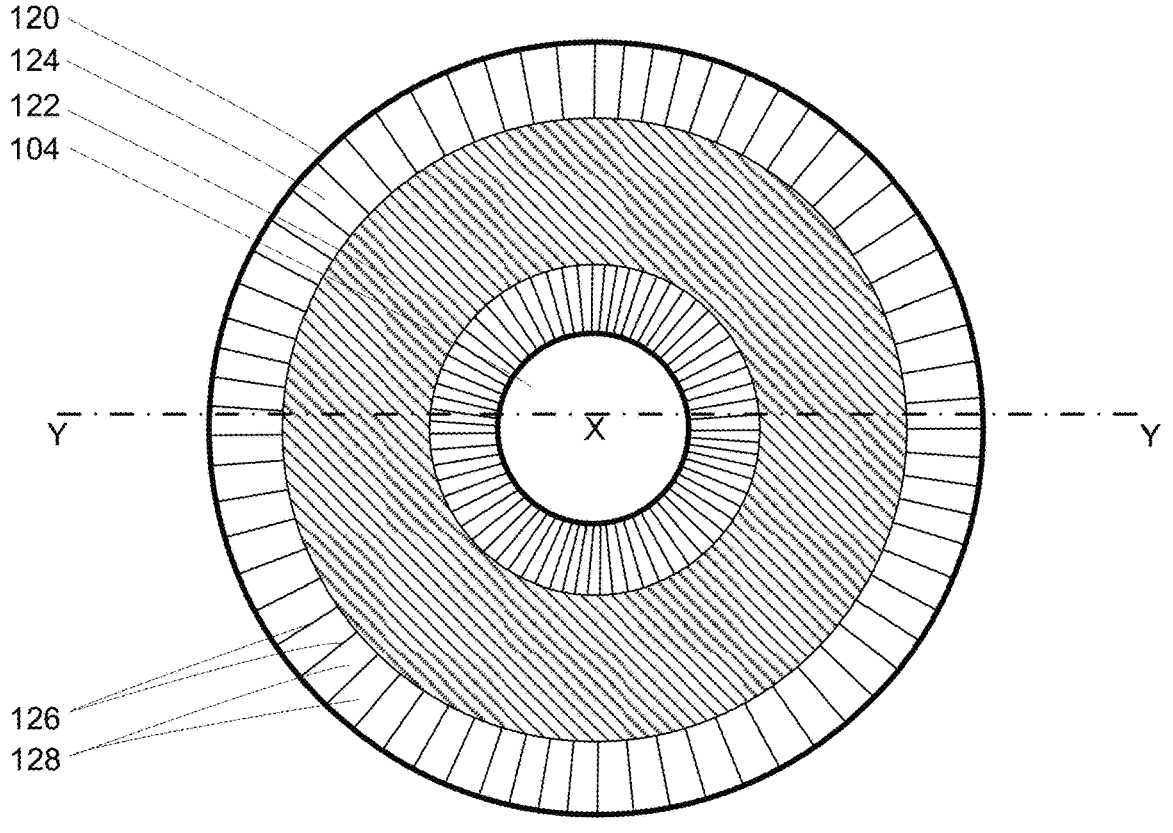

Various embodiments of a motor, which has applications in relation to industrial robotic arms in particular (but is not limited thereto), will now be described.

In overview, the motor described below is equipped with two axial rotors and a radial inner rotor. The two sets of rotor interact with the windings on the stator to generate torque. The motor can be directly connected to a power supply and a robotic arm to realize energy conversion between them. The proposed scheme can be applied to industrial robotic arms which have high requirements for high performance and high torque density.

FIGS. 1A to 1F are various views of a first exemplary embodiment of a motor including a rotor and a stator. The motor 100 including a stator 120 and rotor 140 is shown in cross section in top and side view, and the stator 120 and rotor are also shown in isolation in the same two views.

The stator 120 includes an appropriate core 122 and windings 124, which are electrically and physically sepa-rated, for example by appropriate dividers 126 (which may for example be made of ceramic) creating individual wind-ing sections 128. Appropriate wiring connections (not shown) allow connection of the appropriate number of phases. Typically the motor is a synchronous motor using a three phase supply, which can be divided amongst the windings in any appropriate fashion. Other numbers of phases and other types of construction of motor are possible. The motor can be adapted to a brushed type, for example, and (with appropriate adjustments) features of the stator can be implemented on the rotor, and vice versa. However, a three phase synchronous motor type is best suited to the presently described system.

The rotor 140 is separated from the stator 120 by a small air gap 104 and rotates about an axis 102, which can be considered a reference for any discussion herein of axial and radial directions. The rotor 140 includes a first axial rotor portion 142, a second axial rotor portion 144, and an inner radial rotor portion 146 between the axial portions. The three rotor portions 142, 144, 146 define a recess which encloses the stator 120 in use. The rotor portions 142, 144, 146 include permanent magnet regions 150, 152, 154 respec-tively, disposed around the inside of the recess so as effec-tively to encircle the windings on the stator on three out of four sides. Behind each region of permanent magnets 150, 152, 154 is a back iron portion 160, 162, 164 respectively. The back iron portions are typically as thick as each other, and as thick as the magnets which they adjoin. Thicknesses can vary as needed for any particular application. The rotor includes a hollow central channel 148, but could alterna-tively be solid throughout. In the axial top-down view, the axis of rotation is marked with an 'x'.

It will be appreciated that the sizes and shapes of all of the constituent components mentioned above can be varied as desired or necessary for any particular application. The arrangement of the rotor to interact with the windings both axially and radially facilitates the application of a relatively large torque in a relatively small space, and the overall compactness of the motor makes it particularly useful in the context of robotics. Because of the relatively high torque, gear trains and the like can be dispensed with, and the motor can be used as a direct drive motor. This saves space, weight and complexity, and can reduce the number of failure modes of the system, making the motor yet more useful in the field of robotics (though of course it is not limited to that use, and is applicable anywhere where a relatively high torque motor is required in a relatively compact space, and so on).

One additional feature of the motor not shown in FIGS. 1A to 1F involves the use of Halbach arrays. These will be discussed below in relation to FIGS. 4 and 5.

Figure 2:
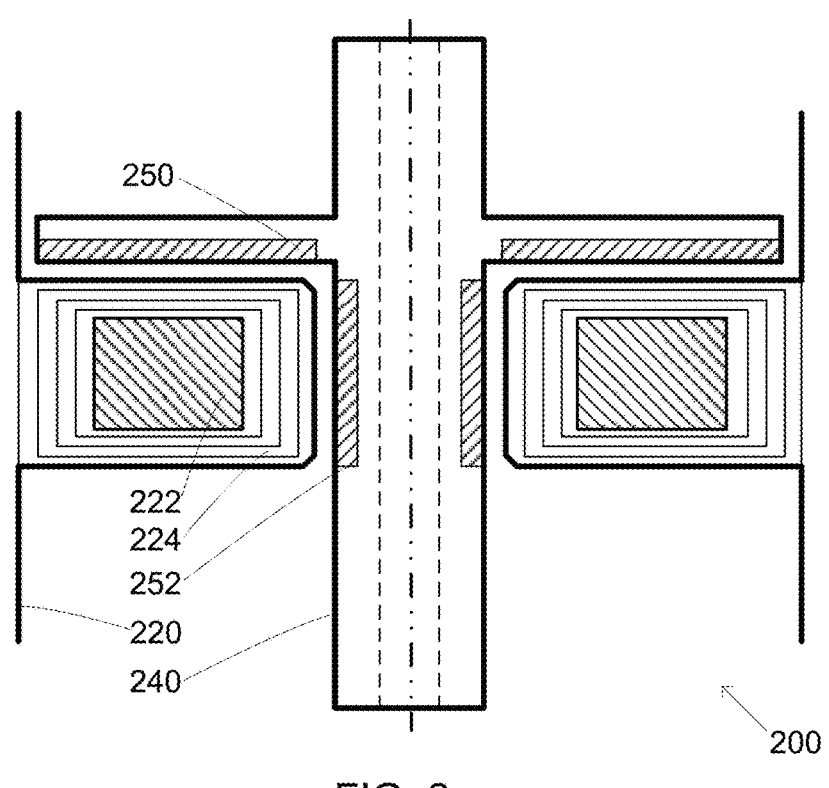
FIG. 2 is a cross sectional view of a second exemplary embodiment of a motor including a rotor and a stator.

FIG. 2 is a cross sectional view of a second exemplary embodiment of a motor including a rotor and a stator. Here the motor 200 includes a stator 220 and rotor 240 as before. The stator includes a core 222 and windings 224. The rotor includes an axial set 250 of permanent magnets and a radial set 252 of permanent magnets. In this example, not as much torque is generated, but the motor is more compact. The combination of axial and radial magnets can still provide improved performance relative to conventional motors which are axial only or radial only. Care must be taken in this case to mitigate tilting of the rotor due to imbalanced forces on the axial portion of the rotor.

Figure 3:
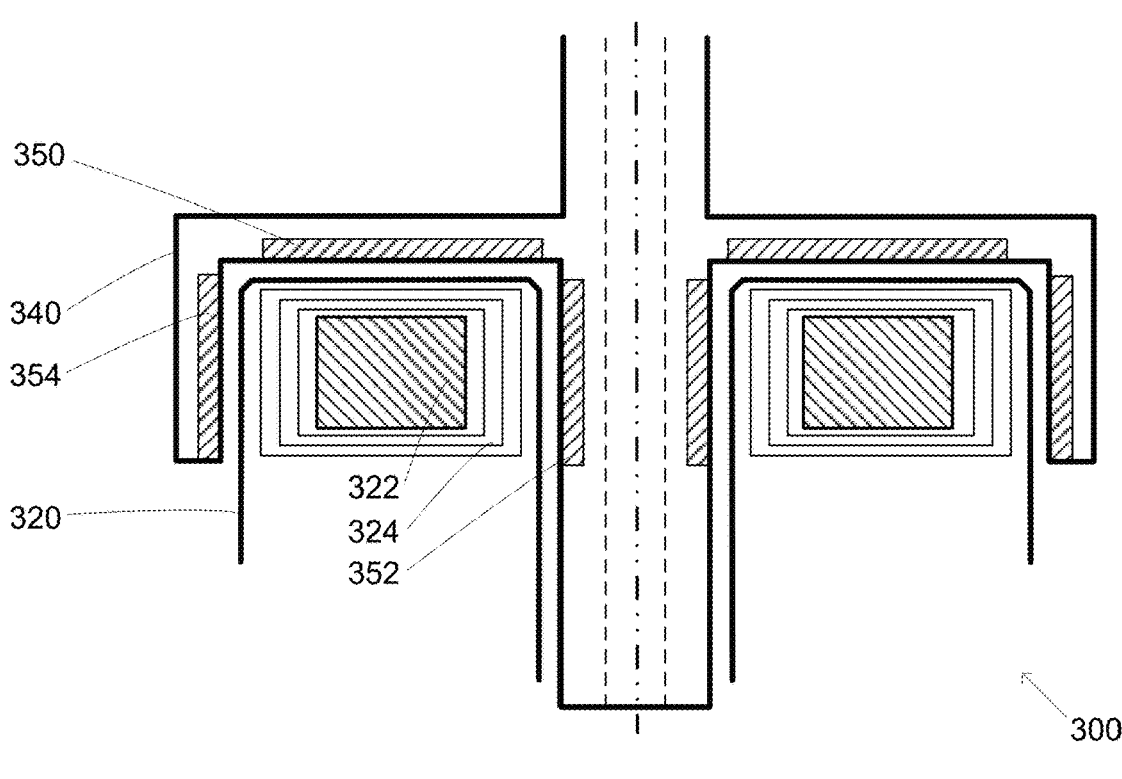
FIG. 3 is a cross sectional view of a third exemplary embodiment of a motor including a rotor and a stator.

FIG. 3 is a cross sectional view of a third exemplary embodiment of a motor 300 including a rotor 340 and a stator 320. In this case, instead of two axial rotor components and one radial rotor component, there are provided two radial rotor components and one axial rotor component. As before, forces on the rotor may be imbalanced and create a tendency to tilt, and this should ideally be mitigated. The stator 320 includes a core 322 and windings 324, as before, and the rotor 340 includes an axial magnet 350, and two radial magnets 352, 354 on either side (radially) of the windings 324.

A few examples have been given here, but it will be appreciated that the general principles discussed herein relating to the combination of axial and radial action can be applied more broadly, as and when appropriate and necessary. It is not intended that the principles discussed herein be limited to specific arrangements of motor, and certainly not limited to those examples given here. Different arrangements of core and/or windings in the stator are possible, for example, and the specific geometry of the rotor and/or stator may of course vary.

Figure 4:
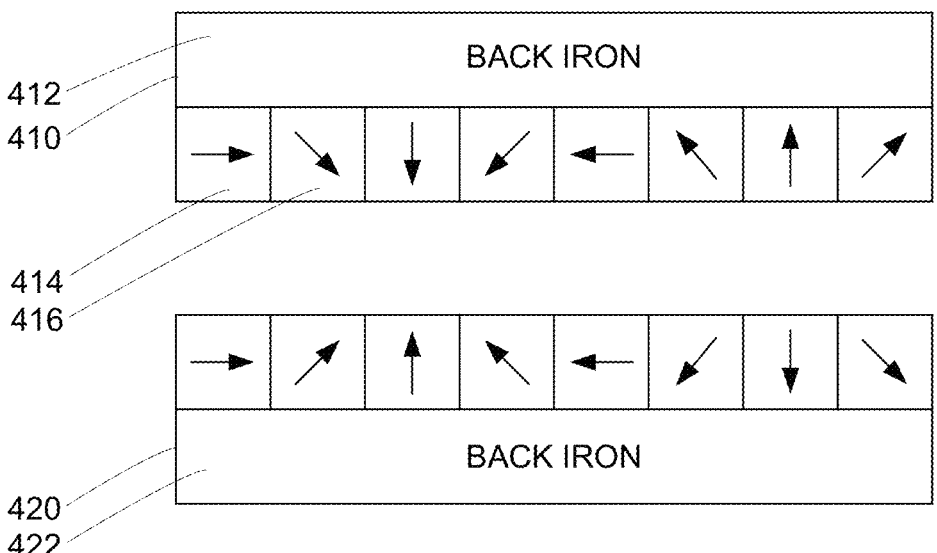
FIG. 4 is a schematic showing the orientation of perma-nent magnets within axial portions of the rotor of FIGS. 1A to 1F.

FIG. 4 is a schematic showing the orientation of permanent magnets within axial portions of the rotor of FIGS. 1A to 1F. The first axial rotor portion 410 and second axial rotor portion 420 are shown schematically. Individual permanent magnets 414, 416 and so on are shown. The back iron is also indicated 412, 422. This figure presents a view of one pole of the axial rotor magnets, as viewed radially inwards from the rim of the axial rotor portion but with the magnets essentially folded flat into a planar representation for ease of reference.

Each pole of the rotor is divided into 8 separate magnets which are rotated 45° each time, in the form of a Halbach array. This is a convenient arrangement, but the pole could be divided into a smaller or greater number of magnets as appropriate or necessary (for example when varying the size of the motor overall). The main characteristic of a Halbach array is to concentrate the magnetic field on one side of the magnets. In this case, the magnetic flux is directed inwards towards the stator, and there is relatively little magnetic field on the rear of the axial rotors (on the side with the back iron). Any appropriate selection of back iron (material or otherwise) can be made to enhance the action of the permanent magnets. It was found that a similar thickness of back iron to the thickness of magnets was preferable. However, the thickness of the back iron may vary depending on context, for example within 1, 2, 5, 10, 15, 20, 30, 40, 50, 75 or 100% of the thickness of the magnets (or otherwise).

The Halbach array also has the effect of making the magnetic field more sinusoidal and reduces magnetic harmonics. Overall this leads to a much improved performance of the motor. The Halbach array also facilitates the incorporation of the different arrangements of magnets within a relatively small space, allowing improved efficiency in interactions between rotor and stator.

One additional feature of the arrangement of magnets shown in FIG. 4 is that the mirroring of the magnets in the first and second axial rotor portions cancels out any imbalanced forces applied to the axial rotor portions. This effectively mitigates the tendency of the rotor to tilt in response to the windings being energised.

Figure 5:
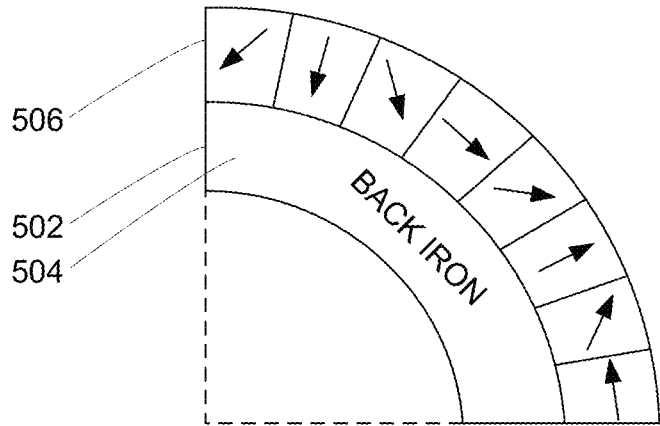
FIG. 5 is a schematic showing the orientation of perma-nent magnets within a radial portion of the rotor of FIGS. 1A to 1F.

FIG. 5 is a schematic showing the orientation of permanent magnets within a radial portion of the rotor of FIGS. 1A to 1F. A corresponding Halbach array is provided here in the (inner) radial stator portion 502. One pole is shown here. It will be appreciated that the number of poles may be varied as desired and, correspondingly, the number of magnets in each Halbach array (and therefore the sequential rotations of each magnet). In the present case, four poles were used, and the division of the array in each pole into 8 separate magnets with 45 degree sequential rotations (that is, involving a lot of 90 degree rotations) is a relatively convenient arrangement. As before, the thickness of the back iron 504 is preferably the same as the thickness of the magnets 506, but can be varied as discussed above.

Figure 6A:
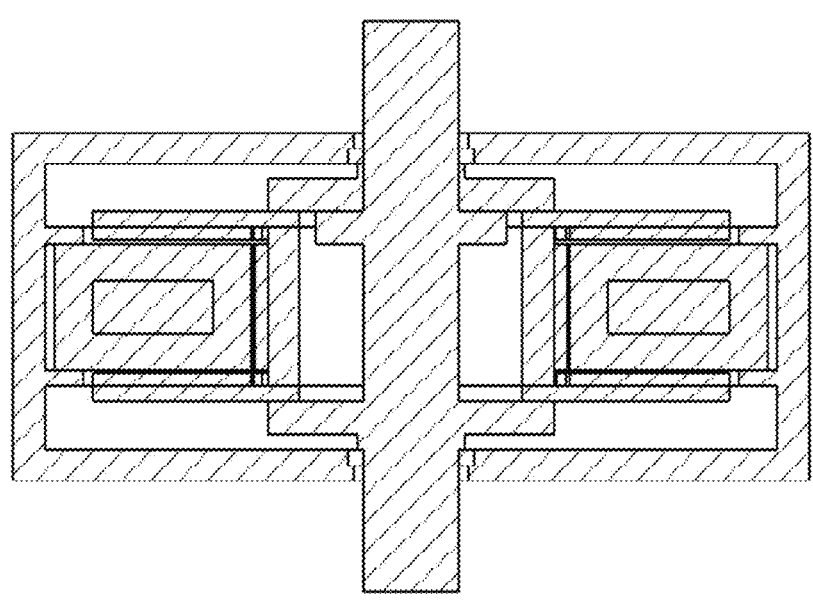
FIGS. 6A to 6C are various views of a fourth exemplary embodiment of a motor including a rotor and a stator.
Figure 6B:
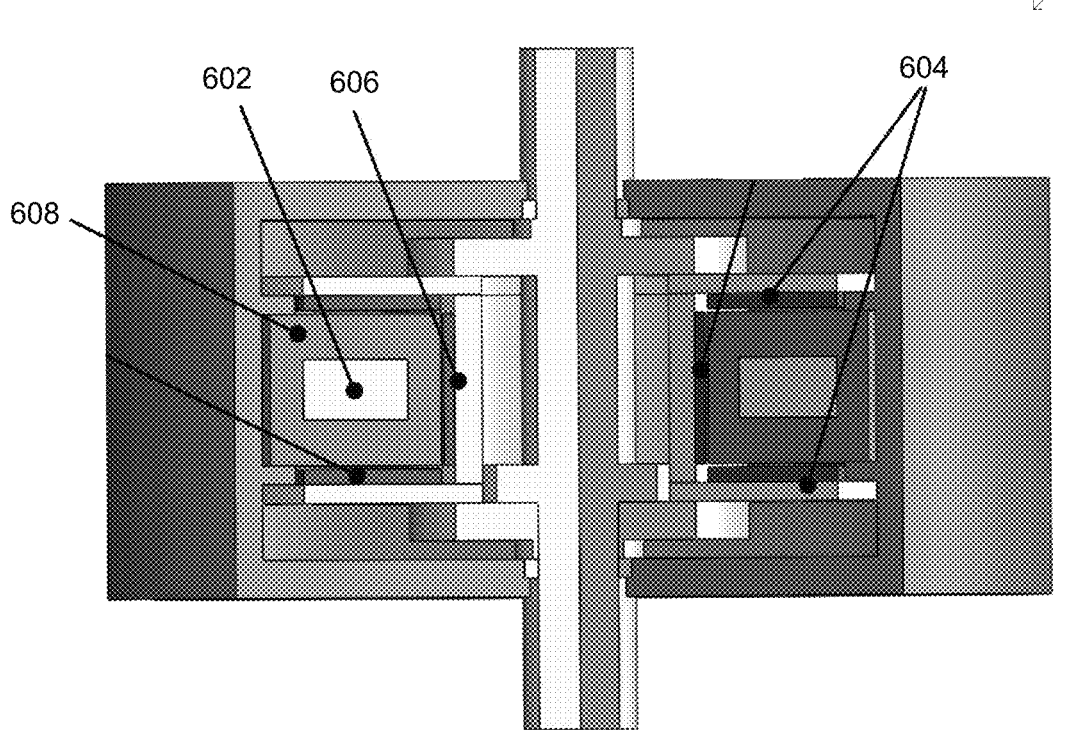
Figure 6C:
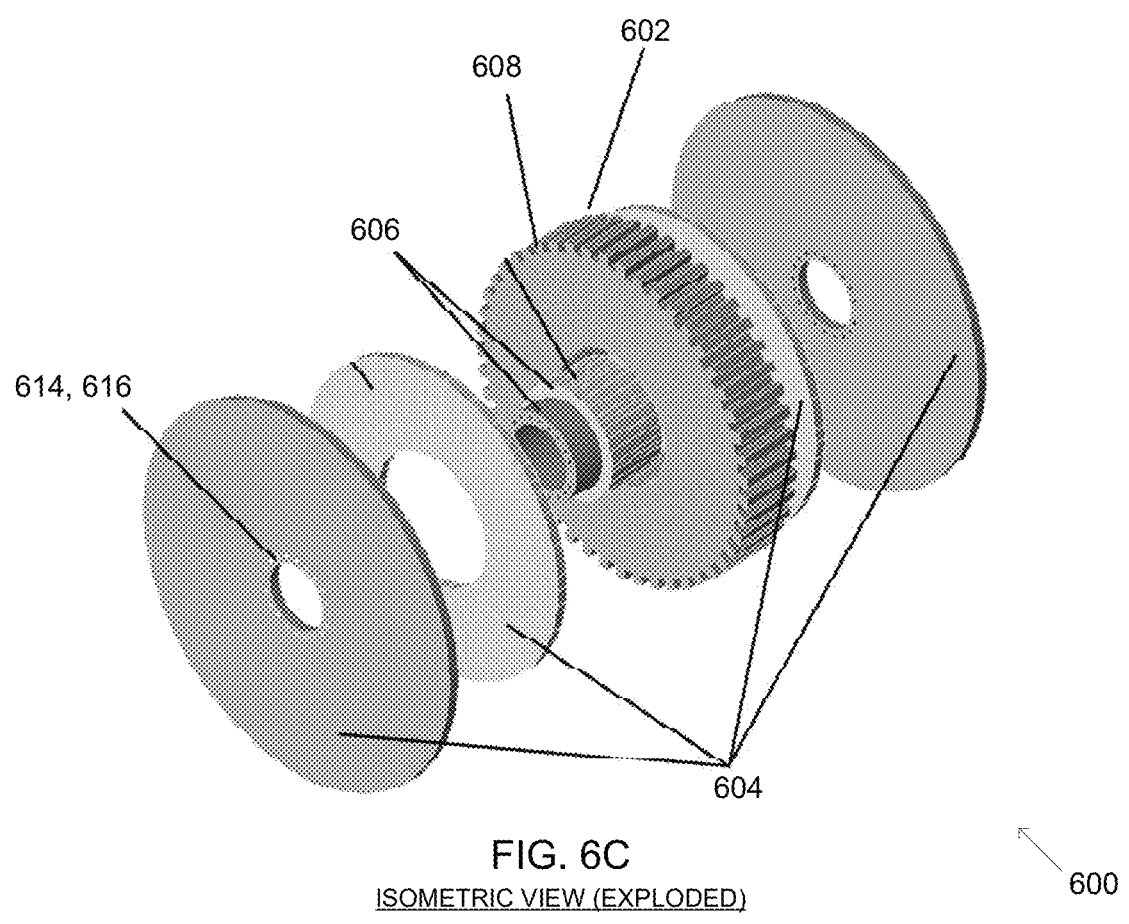

FIGS. 6A to 6C are various views of a fourth exemplary embodiment of a motor 600 including a rotor and a stator, based on the system of FIGS. 1A to 1F.

This particular motor is suitable for application to an industrial robotic arm which is used in the field of industrial manufacture. As before, it comprises a stator 602, axial outer rotor 604, and radial inner rotor 606. There are open slots on the radial inner and axial upper and lower surfaces of stator 602. A set of toroidal windings 608 is placed in the slots. Permanent magnets are mounted on the surface of rotors to increase the flux density in the airgap.

An axial field permanent magnet synchronous motor is composed of the upper and lower parts of the windings and axial outer rotor 604. A radial field permanent magnet synchronous motor is composed of the inner ending of the windings and radial inner rotor 606. Axial outer rotor 604 is composed of Halbach array and radial laminated silicon steel sheets. Radial inner rotor 606 is composed of Halbach array and axial laminated silicon steel sheets.

The axial-radial field in-wheel motor described here can improve the torque density and utilization of windings and stator core through the combination of axial rotor and radial rotor. In the motor, the positioning hole reinforcement structure is adopted between the axial outer rotor and the radial inner rotor on both sides, which improves the stability of the axial rotor structure and avoids tilting during operation. In particular, positioning holes 614 are punched at the outer circumference of the axial outer rotor 604. Stainless steel bolts 616 pass through the positioning holes to strengthen the mechanical structure of the axial rotor.

As previously mentioned, with respect to the axial outer rotor 604, the outer diameter of back iron of the axial outer rotor is equal to the outer diameter of the stator. The outer diameter and inner diameter of permanent magnets on the axial outer rotor are equal to those of stator, respectively. The thicknesses of the back iron and the permanent magnets are preferably the same, but as mentioned, all relevant dimensions may be varied as desired, appropriate or necessary.

Similarly, with respect to the radial inner rotor 606, the inner diameter of back iron of the radial inner rotor is equal to that of axial outer rotor. The thickness of permanent magnets on the radial inner rotor is equal to that of permanent magnets on the axial outer rotor. The height of permanent magnets on the radial inner rotor is equal to the axial length of stator. The thicknesses of the back iron and the permanent magnets are the same. The same caveats apply as regards varying the dimensions.

The invention realizes a direct-drive motor with high torque density, which is suitable for robotic arms in industrial manufacture. It reduces gearboxes needed by traditional motors, thereby reducing production and maintenance costs.

The number of pole pairs of the axial rotor is the same as that of the radial rotors, but other arrangements are possible.

When compared with a conventional motor, the present motor applied on industrial robotic arm possesses the merits of direct-drive, high utilization of windings and stator core, high mechanical strength, small torque ripple and high torque density.

As regards direct-drive, the output torque of traditional motor applied industrial robotic arm is small so that the power transmission system needs a reduction gear to increase its output torque. The present motor has a large output torque and can be directly connected with a robotic arm for transmission. The direct-drive can lead to the elimination of the planetary gear, which greatly reduces the volume of the power transmission system. The elimination of the planetary gear can directly reduce the cost of production and maintenance of the gear.

As regards the high utilization of windings and stator core, traditional motors only make use of the component side in one direction of the stator windings. It means that only the component side in this direction is the effective part of the windings, resulting in long ending and obvious ending effect. The present motor makes full use of the upper, lower and inner component sides of the toroidal windings and only leaves the outer component side to introduce the power line, thereby increasing the electromagnetic torque and reducing the impact of the ending effect.

As regards high mechanical strength, the rotors on both sides of the existing axial motor are fixed on the rotating shaft. They will receive a large unbalanced axial force during the rotation, which would ordinarily cause the rotor to tilt. The present motor fixes the axial rotors on both sides and the radial rotors into a whole through bolts, so that the axial forces received by the axial rotors on both sides cancel each other. It can avoid rotors tilting and improve the mechanical strength.

As regards a small torque ripple, permanent magnets on the rotor of traditional motors, especially axial field motors, are magnetized in the same direction, which leads to large harmonics of the magnetic field produced by rotors in the air gap. It can result in large torque ripples. A Halbach array is used in the present motor, which makes the magnetic field produced by rotors more sinusoidal and reduces torque ripples.

As regards a high torque density, the traditional axial motor make use of the reaction between axial component side of windings and axial magnetic field to produce torque.

Apart from that, the novel motor also makes use of the radial inner component side of the windings. It increase the torque without changing the volume of the motor, thereby increasing the torque density.

Other advantages of the presently described motor(s) may be evident.

Figure 7:
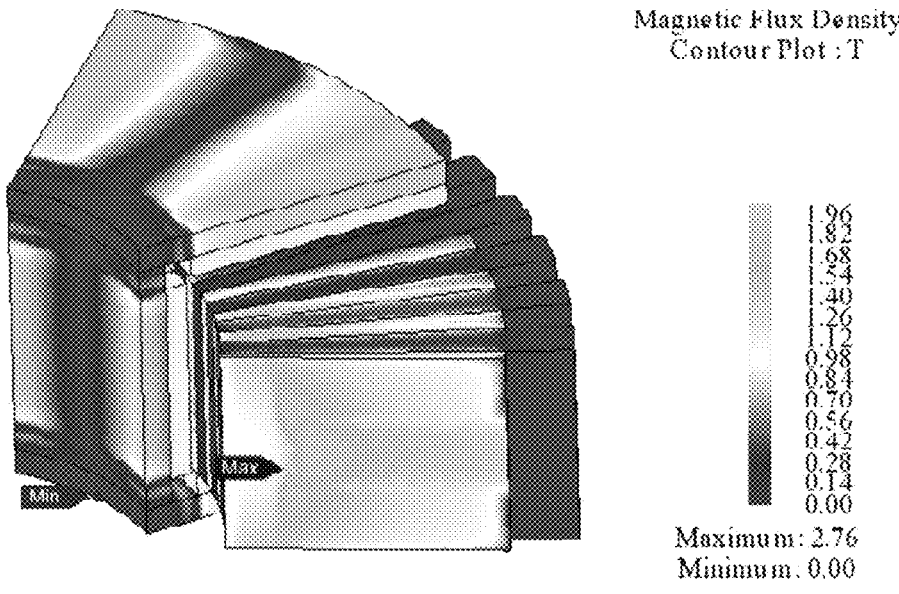
FIG. 7 is a three dimensional plot of magnetic flux density in the motor shown in FIGS. 6A to 6C.

FIG. 7 is a three dimensional plot of magnetic flux density in the motor shown in FIGS. 6A to 6C, in accordance with simulations of the structure shown in FIGS. 6A to 6C. It can be seen that a minimum flux density is found on the rear of the rotor magnet arrays, and relatively much higher flux densities in the region encompassing the magnet arrays and stator windings.

Figure 8:
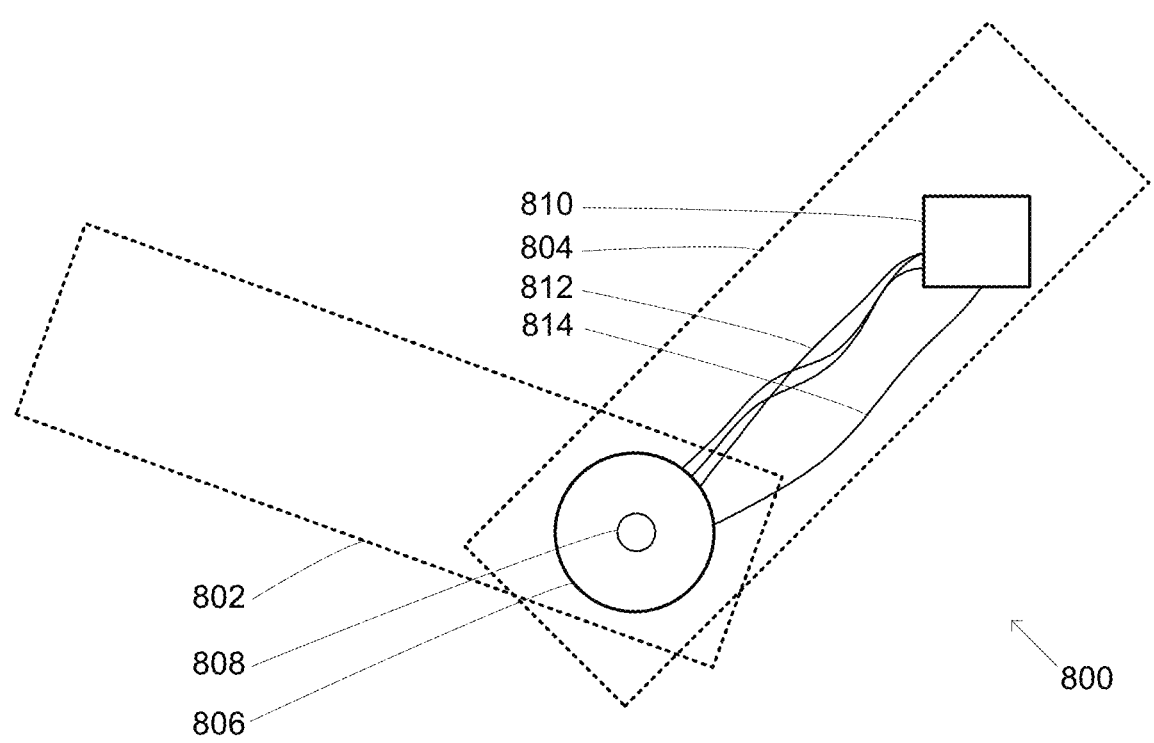
FIG. 8 is a schematic of a robot including a first arrange-ment of a motor as previously illustrated.

FIG. 8 is a schematic of a robot 800 including a first arrangement of a motor as previously illustrated. This shows the above-described motor in the context of one possible application, in robotics. A first robot arm portion 802 and a second robot arm portion 804 are shown. A motor 806 as described above (any embodiment) is shown attached at the joint between arm portions 804, 806 using any appropriate mechanism 808. In this configuration, the motor causes direct relative rotations of the arm portions, thanks to the relatively large torque which the motor can generate in a compact space. A controller system is shown schematically 810, as are electrical connections 812 for driving the stator windings and consequently for causing the movement of the motor. A feedback electrical connection 814 may or may not be provided, for example to provide servo functionality. It will be appreciated that any wired or wireless connection methods may be used as appropriate, and that the controller 810 may be provided in distributed form and/or remote from the robotic arm at least in part.

Figure 9:
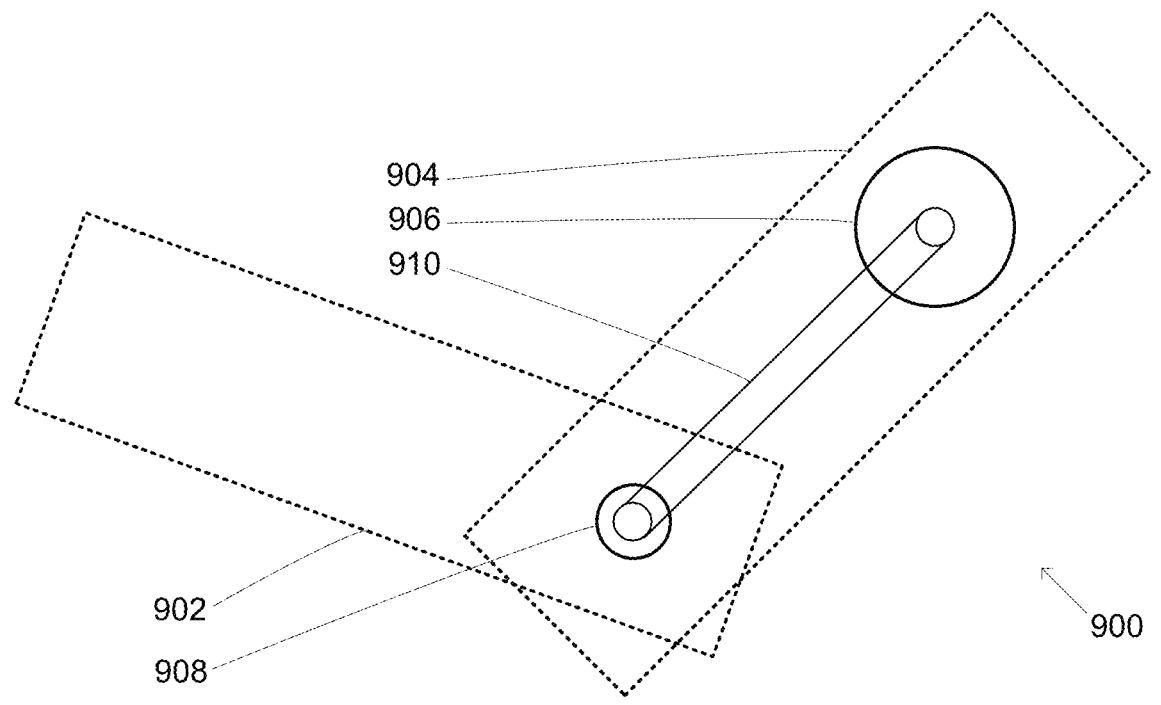
FIG. 9 is a schematic of a robot including a second arrangement of a motor as previously illustrated.

FIG. 9 is a schematic of a robot 900 including a second arrangement of a motor as previously illustrated. Despite the suitability of the presently described motor for direct drive, it may also be used in any other appropriate fashion. In this example, two jointed arm portions 902, 904 are joined at joint 908 and their relative rotation is driven by any appropriate version of the motor 906 as previously described. An appropriate mechanical connection 910 such as a drive belt connects the output of the motor 906 with the arm joint 908. Any appropriate gear system can be used to convert the output of the motor into rotation of the robotic arm.

Figure 10:
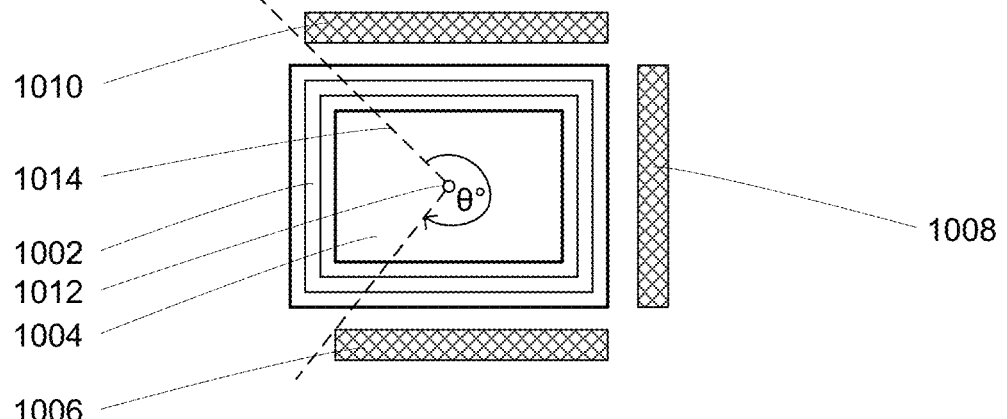
FIG. 10 is an illustration of the measurement of the encirclement of a winding by permanent magnets.

FIG. 10 is an illustration of the measurement of the encirclement of a winding by permanent magnets. In this figure, a set of windings 1002 is shown, as well as a stator core 1004, and three sets 1006, 1008, 1010 of permanent magnets attached to a rotor (not shown). For the purpose of assessing the efficiency of the windings/magnet arrangement, it may be desired to make an objective measurement of the geometry (rather than the electrical or mechanical efficiency of the motor). This can be done simply in this case by taking the geometric centre of the windings (and/or core) or the centre of mass of the same, at point 1012. From this central point, it is then possible to measure the angle across which the magnets surround the windings. The extent of the encirclement is shown by dotted lines including line 1014. In this case an angle of 0° is subtended by the encirclement lines. The larger the value of θ, the more geometrically efficient is the motor. In the present case, θ may be around 270°, but is typically at least greater than 180, 190, 200, 210, 220, 230, 240, 250, 260, 270 or even 280, 290 or 300 degrees. Alternative methods of evaluation may include considering the proportion of the circumference/outer perimeter of the windings which is in close (or substantially 'effective') magnetic contact with the rotor. Typically more than 50, 60, 70, 75 or even 80 or 85% of the outer perimeter of the windings is within substantially close (or 'effective') magnetic contact with permanent magnets on the rotor.

As mentioned above, other permutations of the above-described designs and principles are possible. In any appropriate aspect, features of the rotor can be interchanged with features of the stator. It may be possible to adapt the presently described embodiments to a brushed motor, for example, or to change the number of poles, phases, and so on. The motor may be used as a servo motor or may not provide any dedicated feedback or be used in such a fashion.

Besides the particular application to robotics mentioned above, the present motor could be employed in any context requiring relatively high torque in a compact space. The motor could be used as a direct drive system or could be used in conjunction with conventional gear systems as appropriate. The motor could be used to open or close doors of various kinds, or in industrial processes of various kinds, including mixers, drills, and so on. The motor could be incorporated into reciprocating mechanisms of various kinds. The motor could also be used in electric cars and other vehicles, as a direct drive motor acting on the vehicle axles directly, or otherwise.

It will be appreciated that further modifications may be made to the invention, where appropriate, within the spirit and scope of the claims.

The invention claimed is:

1. A motor comprising:
   a stator, comprising a core and a plurality of windings; and
   a rotor, comprising a plurality of permanent magnets, and configured to rotate about an axis,
   wherein a first portion of the magnets is disposed on two axial rotor portions extending normal to the axis and facing two respective axial sides of the windings, and a second portion of the magnets is disposed on a radial rotor portion extending parallel to the axis facing a radial side of the windings,
   wherein energising the windings causes a torque to be applied to the rotor via said two axial rotor portions and said radial rotor portion, wherein at least one of the first and second portions of magnets are arranged to form a plurality of Halbach arrays, wherein each consecutive magnet is rotated by 45 degrees relative to the preceding magnet, and
   wherein the arrangement of magnets on each axial rotor portion is a mirror copy of the arrangement of magnets on the other.

2. A motor according to claim 1, wherein said axial rotor portions have the same number of magnetic poles as said radial rotor portion.

3. A motor according to claim 1, wherein more than 75% of the outer perimeter of the windings maintains magnetic contact with a permanent magnet disposed on the rotor.

4. A motor according to claim 1, wherein the geometric centre of the windings is encircled by permanent magnets disposed on the rotor and within close magnetic proximity of the windings, the magnets subtending an angle of more than 270 degrees of circumference of the windings.

5. A motor according to claim 1, wherein the windings have four sides and permanent magnets on the rotor are magnetically proximate to at least three of the sides of the windings.

6. A motor according to claim 1, further comprising a reinforcement structure urging said axial rotor portions towards said radial rotor portion.

7. A motor according to claim 6, wherein the reinforcement structure comprises at least one bolt passing through an axial hole in the radial rotor portion and secured on said axial rotor portion.

8. A motor according to claim 1, wherein each said axial rotor portion and the radial rotor portion includes a respective back iron portion disposed on the distal side of the permanent magnets relative to the windings.

9. A motor according to claim 1, wherein all of the permanent magnets are of substantially equal thickness.

10. A motor according to claim 1, wherein the axial length of the permanent magnets on said radial rotor portion is equal to or greater than the axial length of the windings on the stator, both axial lengths being measured along a direction parallel to the axis of rotation.

* * * * *